(12) United States Patent
Belen et al.

(10) Patent No.: US 11,796,095 B2
(45) Date of Patent: Oct. 24, 2023

(54) PIPE FITTING WITH POSITIVE INSTALLATION INDICATOR

(71) Applicant: ASC Engineered Solutions, LLC, Portsmouth, NH (US)

(72) Inventors: Jordan Cameron Belen, West Warwick, RI (US); Matthew William McNamara, Portsmouth, RI (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 8 days.

(21) Appl. No.: 17/482,724

(22) Filed: Sep. 23, 2021

(65) Prior Publication Data

US 2023/0087589 A1 Mar. 23, 2023

(51) Int. Cl.
 *F16L 23/036* (2006.01)

(52) U.S. Cl.
 CPC ......... *F16L 23/036* (2013.01); *F16L 2201/10* (2013.01)

(58) Field of Classification Search
 CPC ....... F16L 21/065; F16L 23/036; F16L 23/08; F16L 2201/10
 See application file for complete search history.

(56) References Cited

U.S. PATENT DOCUMENTS

| | | | |
|---|---|---|---|
| 1,584,711 A | 5/1926 | Astrom | |
| 2,371,121 A | 3/1945 | Basquin | |
| 8,646,813 B1 | 2/2014 | Shemtov | |
| 9,401,578 B2 | 7/2016 | Cumant | |
| 11,592,127 B2 | 2/2023 | Belen et al. | |
| 2015/0030385 A1* | 1/2015 | Bucknell | F16L 23/036 403/337 |
| 2021/0301952 A1 | 9/2021 | Belen et al. | |
| 2023/0167927 A1 | 6/2023 | Belen et al. | |

OTHER PUBLICATIONS

Belen, Jordan Cameron; Non-Final Office Action for U.S. Appl. No. 17/210,966, filed Mar. 24, 2021, dated Jul. 27, 2022, 10 pgs.
Belen, Jordan Cameron; Notice of Allowance for U.S. Appl. No. 17/210,966, filed Mar. 24, 2021, dated Nov. 3, 2022, 5 pgs.

(Continued)

*Primary Examiner* — Aaron M Dunwoody
(74) *Attorney, Agent, or Firm* — Taylor English Duma LLP

(57) ABSTRACT

A fitting assembly includes a pipe fitting defining a fastener opening and a retaining groove; and an indicator assembly configurable in a loosened configuration and a tightened configuration, the indicator assembly comprising: a fastener defining a first fastener portion and a second fastener portion, the second fastener portion extending through the fastener opening; and a positive installation indicator oriented within the retaining groove between the fastener opening and the first fastener portion; wherein, in the tightened configuration, the positive installation indicator is compressed between the pipe fitting and the first fastener portion and extrudes at least partially out of the retaining groove, and in the loosened configuration, the positive installation indicator is substantially hidden within the retaining groove by the first fastener portion.

10 Claims, 7 Drawing Sheets

(56) References Cited

OTHER PUBLICATIONS

Belen, Jordan Cameron; Non-Final Office Action for U.S. Appl. No. 18/103,532, filed Jan. 31, 2023, dated Jun. 11, 2023, 19 pgs.
Belen, Jordan Cameron; Applicant-Initiated Interview Summary for U.S. Appl. No. 18/103,532, filed Jan. 31, 2023, dated Aug. 8, 2023, 2 pgs.
Belen, Jordan Cameron; Notice of Allowance for U.S. Appl. No. 18/103,532, filed Jan. 31, 2023, dated Aug. 21, 2023, 9 pgs.

* cited by examiner

PIPE FITTING WITH POSITIVE INSTALLATION INDICATOR

TECHNICAL FIELD

This disclosure relates to pipe fittings. More specifically, this disclosure relates to an indicator assembly for providing a visual indication that the pipe fitting is properly tightened.

BACKGROUND

Pipe fittings, such as pipe couplings, are commonly used to connect two sections of pipes or other pipe fittings, such as valves, together to form a pipe connection, such as when installing a pipe system or a pipe infrastructure. Some pipe fittings require tightening one or more fasteners to secure the sections of pipes to the pipe fittings. The fasteners typically should be tightened to a desired torque to assure that the clamping force of the pipe fitting provides a reliable seal and/or the pipe section cannot inadvertently separate from the pipe fitting. Thus, improper tightening of the fasteners can result in a failed connection between the pipe sections. However, it can be difficult to know whether the fasteners have been properly tightened. Quality assurance reviews can be made to ensure proper tightening of the fasteners, but such quality assurance reviews can be time consuming and prone to human error.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a fitting assembly comprising a pipe fitting defining a fastener opening and a retaining groove; and an indicator assembly configurable in a loosened configuration and a tightened configuration, the indicator assembly comprising: a fastener defining a first fastener portion and a second fastener portion, the second fastener portion extending through the fastener opening; and a positive installation indicator oriented within the retaining groove between the fastener opening and the first fastener portion; wherein, in the tightened configuration, the positive installation indicator is compressed between the pipe fitting and the first fastener portion and extrudes at least partially out of the retaining groove, and in the loosened configuration, the positive installation indicator is substantially hidden within the retaining groove by the first fastener portion.

Also disclosed is a fitting assembly comprising a pipe fitting comprising a first fitting segment and a second fitting segment; and an indicator assembly configurable in a loosened configuration and a tightened configuration, the indicator assembly comprising: a fastener coupling the first fitting segment to the second fitting segment; a positive installation indicator mounted on the fastener between the first fitting segment and the second fitting segment, the positive installation indicator defining a channel; and a negative installation indicator mounted on the fastener between the first fitting segment and the second fitting segment, the negative installation indicator slidably engaging the channel; wherein, in the loosened configuration, the negative installation indicator is visible, and in the tightened configuration, the positive installation indicator substantially covers the negative installation indicator and the negative installation indicator is hidden.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
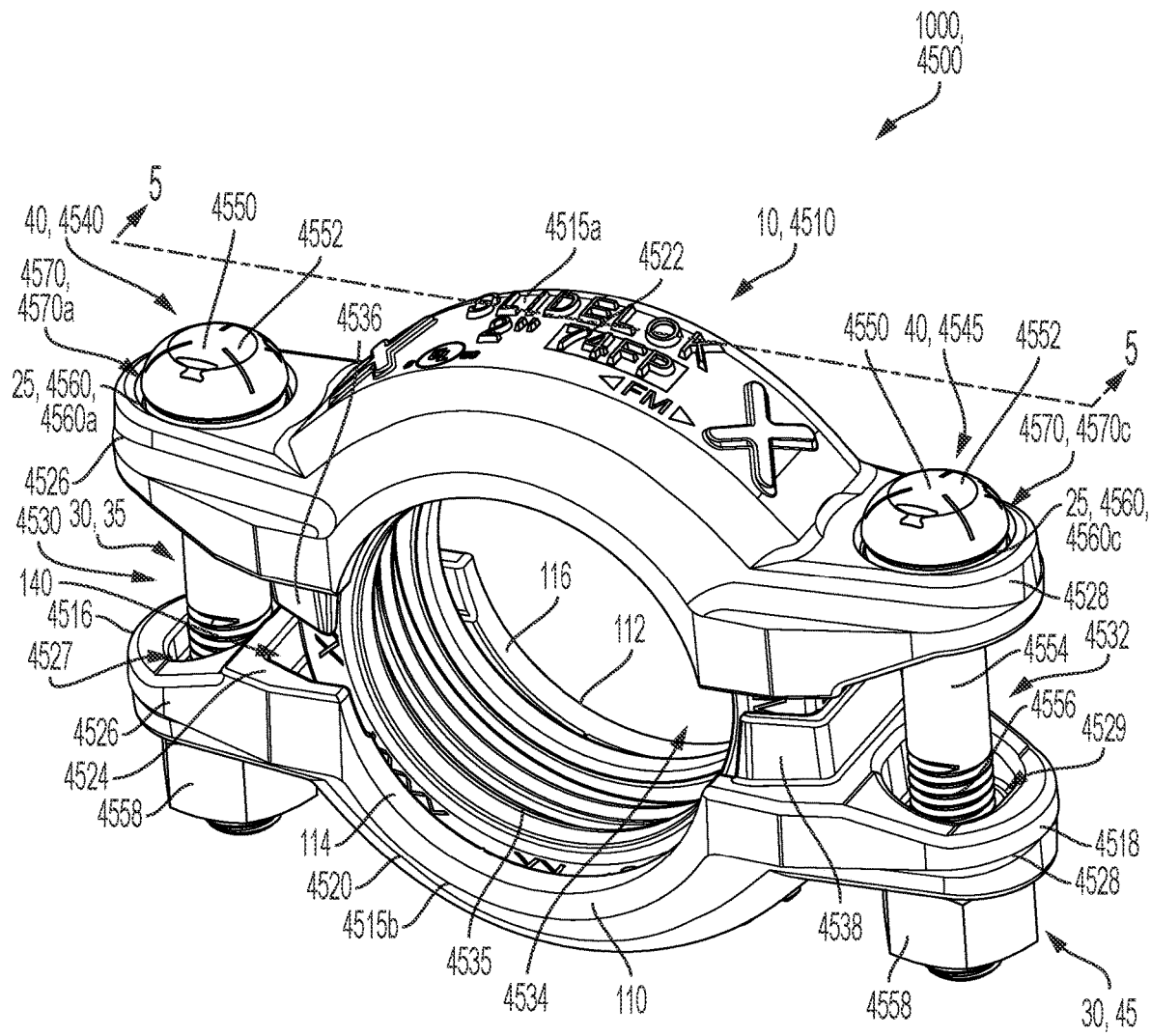
FIG. 1 is a perspective view of a coupling assembly comprising a pipe coupling and a pair of indicator assemblies, in accordance with an example aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about W, L, D, H, θ or substantially W, L, D, H, θ on a particular measurement scale measures within a range between W, L, D, H, θ plus an industry-standard upper tolerance for the specified measurement and W, L, D, H, θ minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an indicator assembly and associated methods, systems, devices, and various apparatus. The indicator assembly can comprise a fastener and an indicator mounted on the fastener. It would be understood by one of skill in the art that the disclosed indicator assembly is described in but a few exemplary aspects among many. No particular terminology or description should be considered limiting on the disclosure or the scope of any claims issuing therefrom.

FIG. 1 illustrates a fitting assembly 1000 according to an example aspect of the present disclosure. The fitting assembly 1000 can comprise a pipe fitting 10 and at least one indicator assembly 30. Example aspects of the pipe fitting 10 can be connected to one or more pipe sections 700 (shown in FIG. 7) or other pipe fittings. The pipe fitting 10 can be any suitable type of fitting, including but not limited to, a coupler, adapter, tee, elbow, flange, pipe coupling, pipe clamp, and the like. In the present aspect, the fitting assembly 1000 can be a coupling assembly 4500, and the pipe fitting 10 can be a pipe coupling 4510, as shown. The pipe fitting 10 can be configured to connect first and second pipe sections 700*a,b* (shown in FIG. 7) together. Example aspects of the pipe coupling 4510 can comprise a first fitting segment, such as an upper coupling segment 4515*a*, and a second fitting segment, such as a lower coupling segment 4515*b*. The upper and lower coupling segments 4515*a,b* can be identical in the present aspect, and when assembled together, the upper and lower coupling segments 4515*a,b* can be mirror images of one another. Furthermore, each of the upper and lower coupling segments 4515*a,b* can be substantially C-shaped in the present aspect. In other aspects, the pipe coupling 4510 can comprise more or fewer coupling segments 4515. In example aspects, each of the upper and lower coupling segments 4515*a*,4515*b* can define a first end 4516, an opposing second end 4518, and a central section 4520 between the first end 4516 and second end 4518. Additionally, each of the upper and lower coupling segments 4515*a,b* can define a front end 110 and a rear end 112. Each of the upper and lower coupling segments 4515*a*, 4515*b* can further define an outer surface 4522 and an inner surface 4524, and the inner surface 4524 of the upper coupling segment 4515*a* can face the inner surface 4524 of the lower coupling segments 4515*b*. In example aspects, the upper and lower coupling segments 4515*a*,4515*b* can comprise a cast material, such cast iron, including ductile iron in some aspects. In other example aspects, the upper and lower coupling segments 4515*a*,4515*b* can be formed from another suitable material, or a combination of materials, that are known in the art, including but not limited to other metals, plastics, composites, and the like.

A first fastener lug 4526 can be formed at the first end 4516 of each of the upper and lower coupling segments 4515*a*,4515*b*, and a second fastener lug 4528 can be formed at the second end 4518 of each of the upper and lower coupling segments 4515*a*,4515*b*. The central section 4520 can define an arcuate shape and can extend between the corresponding first and second fastener lugs 4526,4528. The first fastener lug 4526 of the upper coupling segment 4515*a* can be substantially vertically aligned with the first fastener lug 4526 of the lower coupling segments 4515*b*, relative to the orientation shown, and a first gap 4530 can be defined therebetween. The second fastener lug 4528 of the upper coupling segment 4515*a* can be substantially vertically aligned with the second fastener lug 4528 of the lower coupling segments 4515*b*, relative to the orientation shown, and a second gap 4532 can be defined therebetween. Each of the first fastener lugs 4526 can define a first fastener opening 4527 formed therethrough, and each of the second fastener lugs 4528 can define a second fastener opening 4529 formed therethrough.

As shown, the inner surfaces 4524 of the upper and lower coupling segments 4515*a*,4515*b* can define a coupling void 4534 between the central sections 4520. The coupling void 4534 can be configured to receive opposing ends 702,704 (shown in FIG. 7) of the first and second pipe sections 700*a*,*b*, respectively, therethrough to couple the first pipe section 700*a* to the second pipe section 700*b*. In some aspects, after the pipes are inserted into an annular gasket 4535, the coupling segments 4515*a*,*b* can be configured to be assembled around a joint 710 (shown in FIG. 7) between the first pipe section 700*a* and the second pipe section 700*b*. In other aspects, the coupling segments 4515*a*,*b*, can be placed onto the end of the first pipe section 700*a* in a pre-assembled configuration and can then receive the corresponding end of the second pipe section 700*b* to join the first pipe section 700*a* to the second pipe section 700*b*. In other aspects, pre-assembled coupling segments 4515*a*,*b* can be placed onto and slid over the first pipe section 700*a*, the second pipe section 700*b* can then be aligned with the first pipe section 700*a*, and the coupling segments 4515*a*,*b* can be slid back to cover the joint 710. In the present aspect, each of the coupling segments 4515*a*,*b* can define a first arcuate key 114 extending along the central section 4520 at the front end 110 and a second arcuate key 116 opposite the first arcuate key 114 and extending along the central section 4520 at the rear end 112. In some aspects, the first pipe section 700*a* and/or the second pipe section 700*b* can define grooved or shouldered ends, and the first and second arcuate keys 114,116 of the coupling segments 4515*a*,*b* can engage the grooved or shouldered ends when the coupling segments 4515*a*,*b* are drawn together by tightening one or more fasteners 40. In some aspects, the first pipe section 700*a* and/or second pipe section 700*b* can define plain ends 708 (shown in FIG. 7), and the first and second arcuate keys 114,116 can grip an outer surface 706 of the plain ends 708 of the pipe sections 700*a*,*b*. Plain ends 708 can be ends that do not define a designated groove or shoulder to be engaged by the arcuate keys 114,116.

In example aspects, the annular gasket 4535 can be positioned between the first and second arcuate keys 114,116 of the upper and lower coupling segments 4515*a*,4515*b*. According to example aspects, the inner surface 4524 of each of the upper and lower coupling segments 4515*a*,*b* can define a gasket channel 535 (shown in FIG. 5) within which the annular gasket 4535 can be positioned. The annular gasket 4535 can be configured to seal against the outer surface 706 of each of the pipe sections 700. In the present aspect, a first coupling tongue 4536 can extend from the inner surface 4524 of the upper coupling segment 4515*a* between the corresponding first fastener opening 4527 and the central section 4520. Similarly, a second coupling tongue 4538 can extend from the inner surface 4524 of the lower coupling segment 4515*b* between the corresponding second fastener opening 4529 and the central section 4520. Each of the first and second coupling tongues 4536,4538 can engage a corresponding groove 140 on the opposing lower and upper coupling segments 4515*b*,*a*, respectively, when the fasteners 40 are tightened to prevent the annular gasket 4535 from extruding out of the gasket channel 535 between the upper and lower coupling segments 4515*a*,*b*.

The upper and lower coupling segments 4515*a*,4515*b* can be secured together by the one or more fasteners 40. For example, the fasteners 40 can comprise a first fastener 4540 and a second fastener 4545. As shown, the first fastener 4540 can be configured to extend through the each of the first fastener openings 4527 to couple the upper and lower coupling segments 4515*a*,4515*b* together at the first ends 4516 thereof, and the second fastener 4545 can be configured to extend through each of the second fastener openings 4529 to couple the upper and lower coupling segments 4515*a*,4515*b* together at the second ends 4518 thereof. Each of the first and second fasteners 4540,4545 can be selectively loosened and tightened, as described in further detail below. In the present aspect, each of the first and second fasteners 4540,4545 can comprise a threaded bolt 4550 and a threaded nut 4558. The threaded bolt 4550 can define a first fastener portion, such as a bolt head 4552, and a second fastener portion, such as a bolt shaft 4554. The bolt shaft 4554 can define threading 4556, as shown, distal from the bolt head 4552.

Referring to the second fastener 4545, and wherein the following description can also be illustrative of the first fastener 4540, the bolt shaft 4554 can extend through the second fastener opening 4529 of the upper coupling segment 4515*a*, and the bolt head 4552 can face the outer surface 4522 of the upper coupling segment 4515*a*. The bolt head 4552 can be sized to prohibit passage through the second fastener opening 4529 of the upper coupling segment 4515*a*. The bolt shaft 4554 can span the second gap 4532 defined between the second fastener lugs 4528 and can extend through the second fastener opening 4529 of the lower coupling segment 4515*b*. The threaded nut 4558 can be threaded onto the bolt shaft 4554 distal to the bolt head 4552 and can face the outer surface 4522 of the lower coupling segment 4515*b*. The threaded nut 4558 can be sized to prohibit passage through the second fastener opening 4529 of the lower coupling segments 4515*b*. To draw the second ends 4518 of the upper and lower coupling segments 4515*a*, 4515*b* closer together, and to thus tighten the pipe coupling 4510 onto the pipe sections 700, the threaded nut 4558 can be tightened on the bolt shaft 4554 by rotating the threaded nut 4558 relative to the threaded bolt 4550. In other aspects, the first and second fasteners 4540,4545 can be any other suitable fastener known in the art, including screws, set screws, rivets, and the like.

As the first and second fasteners 4540,4545 are tightened, the first and second arcuate keys 114,116 can engage the first and second pipe sections 700*a*,*b*, respectively, to retain the first and second pipe sections 700*a*,*b* between the upper and lower coupling segments 4515*a*,*b*. As described above, in some aspects, the first and second arcuate keys 114,116 can engage grooves or shoulders formed at or near the opposing ends 702,704 of the first and second pipe sections 700*a*,*b*, respectively. In other aspects, either or both of the opposing ends 702,704 can be the plain ends 708, as shown, and the first and second arcuate keys 114,116 can grip the plain ends 708. In some aspects, the arcuate keys 114,116 can further define gripping features, such as teeth, to grip the pipe sections 700. Furthermore, in some aspects, either or both of the upper and lower coupling segments 4515*a*,*b*, can be configured to deform around the pipe sections 700*a*,*b* to ensure that the coupling segments 4515*a*,*b* have properly engaged the pipe sections 700*a*,*b* and to ensure that the annular gasket 4535 is properly sealed against the outer surface 706 of each of the pipe sections 700. Thus, in some aspects, the indicator assemblies 30 can be configured to indicate that the upper and lower coupling segments 4515a,b have been sufficiently deformed around the pipe sections 700.

Figure 6:
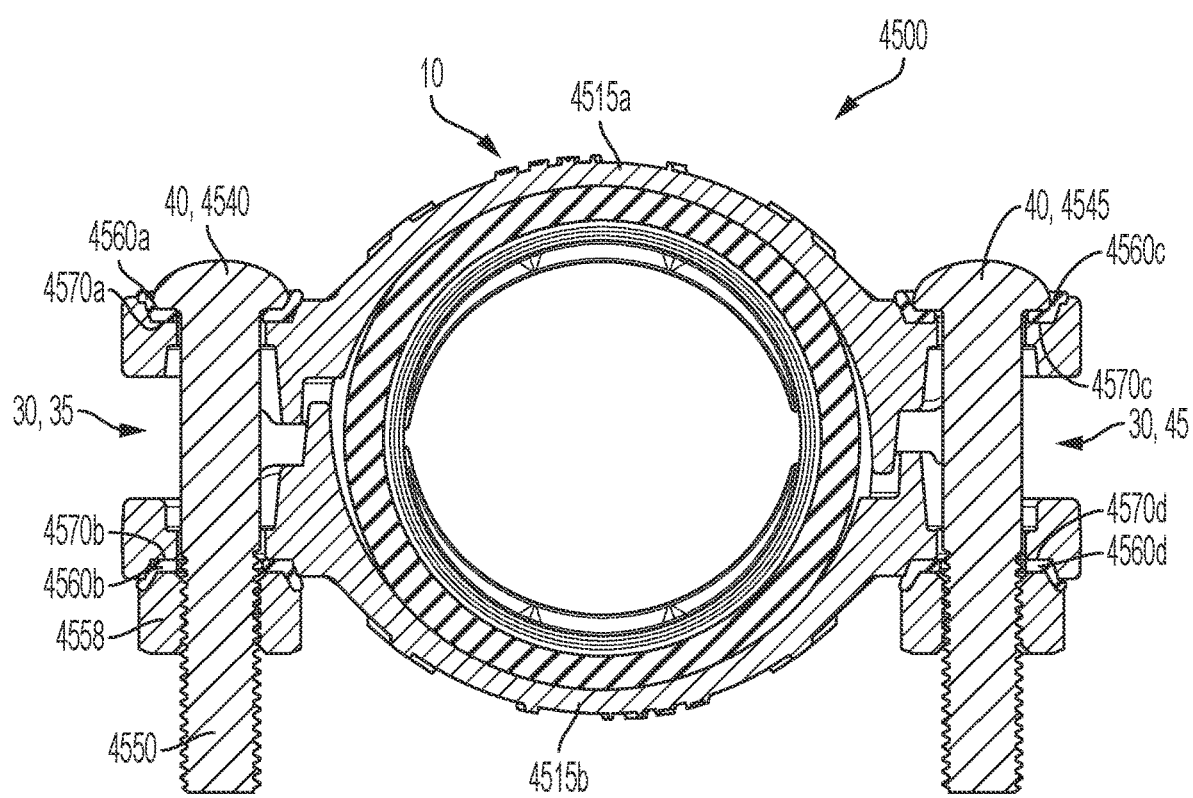
FIG. 6 is a cross-sectional view of the coupling assembly of FIG. 1 taken along line 5-5 in FIG. 1, wherein each of the indicator assemblies is in a tightened configuration.

The fitting assembly 1000 can further comprise one or more of the indicator assemblies 30. For example, as shown, the indicator assemblies 30 can comprise a first indicator assembly 35 and a second indicator assembly 45. The indicator assemblies 30 can be configured in a loosened configuration, as shown, and a tightened configuration, as shown in FIG. 6. According to example aspects, each of the indicator assemblies 30 can comprise one of the fasteners 40 (i.e., the first and second fasteners 4540,4545) and one or more positive installation indicators 25. In the present aspect, the positive installation indicators 25 can be used with the threaded bolts 4550, but in other aspects can be used with any other suitable fastener 40 where it is desired to indicate proper tightening of the fastener 40. In the present aspect, each of the positive installation indicators 25 can be formed as an indicator ring 4560. In the present aspect, the indicator rings 4560 can comprise a resilient, elastic material, including but not limited to, rubber, foam, or plastic. The indicator rings 4560 can formed by molding or casting in a die. Each of the indicator rings 4560 can define an outer diameter that can be greater than a diameter of the first and second fastener openings 4527,4529, as described in further detail below. Additionally, in the present aspect, each of the indicator rings 4560 can be identical in size and shape; however, in other aspects, the indicator rings 4560 can vary in size and/or shape to accommodate for different sizes and/or shapes of the fasteners 40 or the pipe fitting 10.

Figure 5:
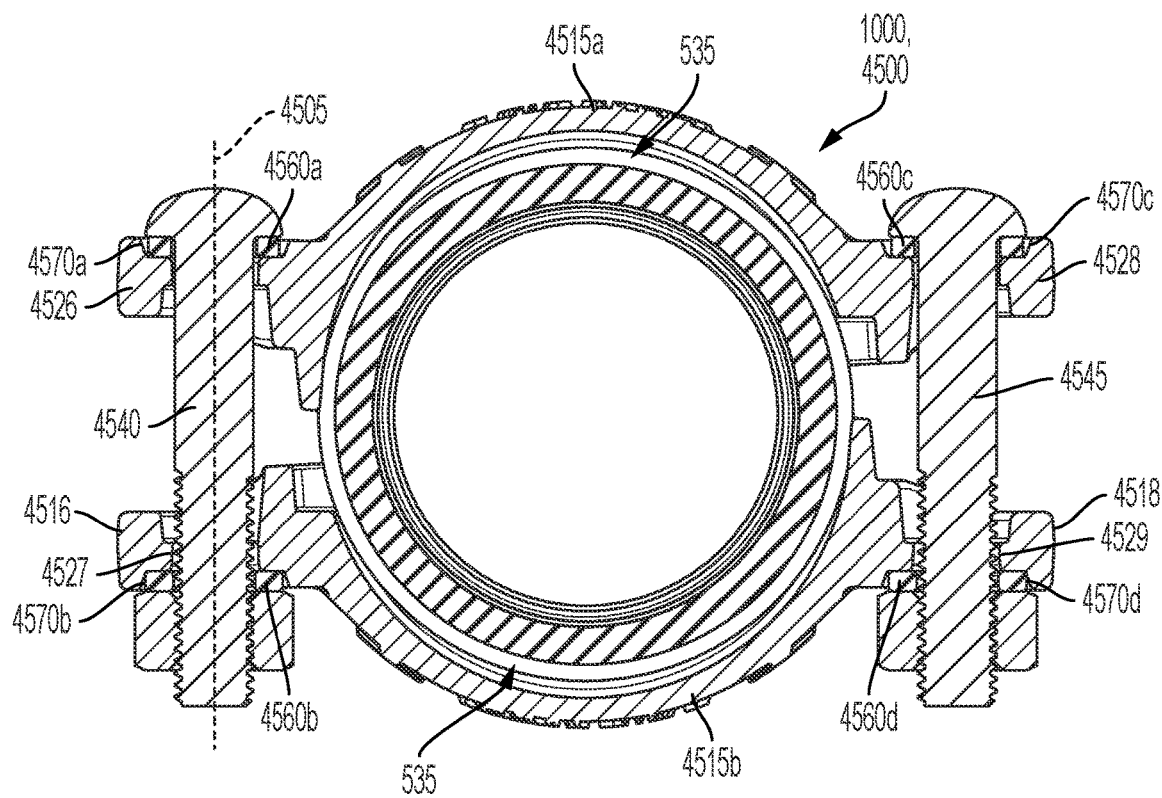
FIG. 5 is a cross-sectional view of the coupling assembly of FIG. 1 taken along line 5-5 in FIG. 1, wherein each of the indicator assemblies is in a loosened configuration.

Example aspects of the indicator rings 4560 can comprise a first upper indicator ring 4560a, a first lower indicator ring 4560b (shown in FIG. 2), a second upper indicator ring 4560c, and a second lower indicator ring 4560d (shown in FIG. 5). In other aspects, the fitting assembly 1000 can comprise more or fewer of the positive installation indicators 25. For example, in other aspects, the fitting assembly 1000 can comprise the first and second upper indicator rings 4560a,c only, or the first and second lower indicator rings 4560b,d only. The first upper indicator ring 4560a and first lower indicator ring 4560b can be mounted on the first fastener 4540, and the second upper indicator ring 4560c and the second lower indicator ring 4560d can be mounted on the second fastener 4545. The first fastener 4540, first upper indicator ring 4560a, and first lower indicator ring 4560b can together define the first indicator assembly 35, and the second fastener 4545, second upper indicator ring 4560c, and second lower indicator ring 4560d can together define the second indicator assembly 45.

In example aspects, each of the indicator rings 4560 can be received within a corresponding retaining groove 4570 of the pipe coupling 4510. The retaining grooves 4570 can be formed as countersinks or counterbores, and each of the retaining grooves 4570 can be aligned with a corresponding one of the first and second fastener openings 4527,4529. For example, the outer surface 4522 of the upper coupling segment 4515a can define a first upper retaining groove 4570a in the corresponding first fastener lug 4526, which can surround the corresponding first fastener opening 4527. The outer surface 4522 of the upper coupling segment 4515a can further define a second upper retaining groove 4570c in the second fastener lug 4528, which can surround the corresponding second fastener opening 4529. The outer surface 4522 of the lower coupling segments 4515b can similarly define first and second lower retaining grooves 4570b,4570d (shown in FIG. 5) surrounding the corresponding first and second fastener openings 4527,4529. In example aspects, the first and second upper indicator rings 4560a,c can be received in the first and second upper retaining grooves 4570a,c of the upper coupling segment 4515a, and the first and second lower indicator rings 4560b,d can be received in the first and second lower retaining grooves 4570b,d of the lower coupling segments 4515b. When the fasteners 40 are loosened, as shown, each of the indicator rings 4560 can be substantially hidden within the corresponding retaining groove 4570. For example, each of the indicator rings 4560 can be substantially hidden by the adjacent bolt head 4552 or adjacent threaded nut 4558. The indicator assemblies can be in the loosened configuration when the fasteners 40 are loosened.

To tighten the fasteners 40 and to configuration the indicator assemblies 30 in the tightened configuration, each of the threaded nuts 4558 can be tightened on the corresponding threaded bolt 4550 to a desired torque and travel distance to ensure that the first and second arcuate keys 114,116 of the pipe coupling 4510 can properly grip the first and second pipe sections 700a,b (such as engaging grooves or shoulder formed in the ends 702,704 of the pipe sections 700a,b, or by gripping the plain ends 708 of the pipe section 700a,b). Upon tightening of the first fastener 4540, the first upper indicator ring 4560a can be compressed between the upper coupling segment 4515a and the bolt head 4552 of the first fastener 4540, and the first lower indicator ring 4560b can be compressed between the lower coupling segment 4515b and the threaded nut 4558 of the first fastener 4540. Similarly, upon tightening of the second fastener 4545, the second upper indicator ring 4560c can be compressed between the upper coupling segment 4515a and the bolt head 4552 of the second fastener 4545, and the second lower indicator ring 4560d can be compressed between the lower coupling segment 4515b and the threaded nut 4558 of the second fastener 4545. As the first and second upper indicator rings 4560a,c are compressed, at least a portion of each of the first and second upper indicator rings 4560a,c extrude out of the corresponding first or second upper retaining groove 4570a,c and/or around the bolt head 4552 of the corresponding first or second fastener 4540,4545.

As the first and second lower indicator rings 4560b,d are compressed, a portion of each of the first and second lower indicator rings 4560b,d extrude out of the corresponding first or second lower retaining groove 4570b,d and/or around the threaded nut 4558 of the first or second fastener 4540, 4545, as shown in FIG. 6. The extruded portions of the indicator rings 4560 can be externally visible to a viewer, such as an installer, upon tightening of the first and second fasteners 4540,4545 to the torque required for the pipe coupling 4510 to properly grip the pipe sections 700. Thus, the extruded portions of the indicator rings 4560 can visually indicate that the first and second fasteners 4540,4545 are suitably tightened in the tightened configuration. In some aspects, the indicator rings 4560 can be a color different from the color of the upper and lower coupling segments 4515a,4515b and/or the fasteners 40, for easy visual verification of the extruded portions. For example, in a particular aspect, the indicator rings 4560 can be green. In other aspects, the indicator rings 4560 can be any other suitable color, such as, orange, red, yellow, black, or the like.

Figure 2:
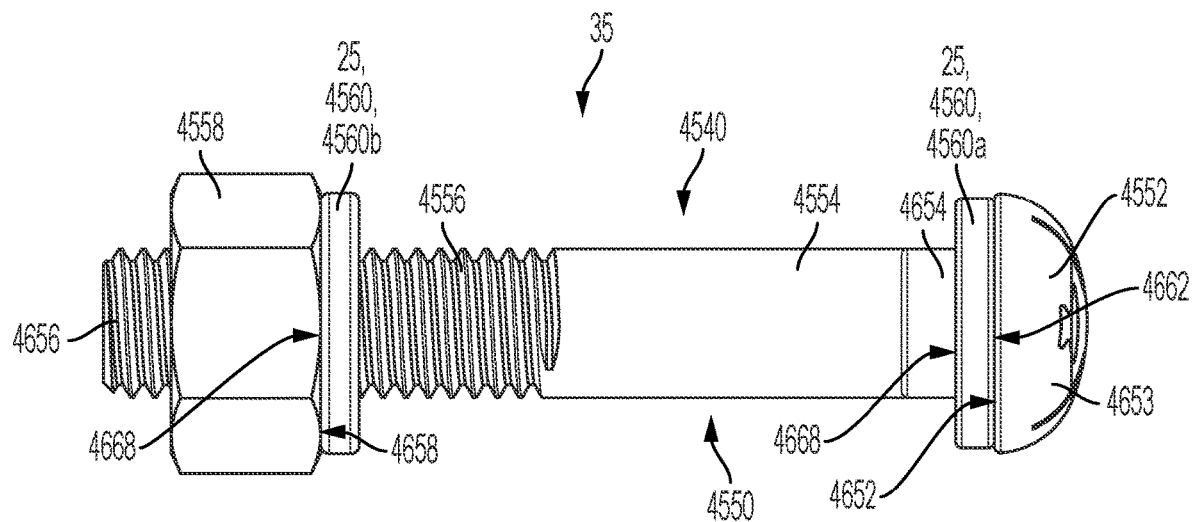
FIG. 2 is a front view of one of the indicator assemblies of FIG. 1 comprising a pair of positive installation indicators mounted on a fastener.

FIG. 2 illustrates the first indicator assembly 35 according to an example aspect of the present disclosure, which can also be illustrative of the second indicator assembly 45 (shown in FIG. 1). The first indicator assembly 35 comprises the first upper indicator ring 4560a and the first lower indicator ring 4560b assembled on the first fastener 4540. As shown, the first fastener 4540 can comprise the threaded bolt 4550 and the threaded nut 4558. The threaded bolt 4550 can define the bolt head 4552 and the bolt shaft 4554. The bolt shaft 4554 can define a proximal end 4654 coupled to the bolt head 4552 and a distal end 4656 opposite the proximal end 4654. In some aspects, the threading 4556 of the bolt shaft 4554 can extend from the distal end 4656 to the proximal end 4654. In other aspects, as shown, the bolt shaft 4554 can define the threading 4556 extending from the distal end 4656 and terminating at a point between the distal end 4656 and proximal end 4654. The threaded nut 4558 can be rotationally engaged with the threading 4556 of the bolt shaft 4554. In example aspects, the threaded nut 4558 can define a substantially planar nut engagement surface 4658 facing the bolt head 4552. Furthermore, according to example aspects, the bolt head 4552 can define a substantially planar bolt engagement surface 4652 coupled to the bolt shaft 4554 and facing the threaded nut 4558. In other aspects, the bolt engagement surface 4652 may not be planar. Furthermore, the nut engagement surface 4658 can be planar or nonplanar. The bolt head 4552 can further define a bolt outer surface 4653 opposite the bolt engagement surface 4652, and the bolt outer surface 4653 can be substantially domed in the present aspect. In example aspects, the planar bolt engagement surface 4652 can define a diameter of the bolt head 4552.

According to example aspects, each of the indicator rings 4560 can define a ring opening 4760 (shown in FIG. 3) through which the bolt shaft 4554 of the first fastener 4540 can extend. Each of the first upper indicator ring 4560a and the first lower indicator ring 4560b can be mounted on the bolt shaft 4554 between the bolt head 4552 and the threaded nut 4558. Furthermore, each of the first upper indicator ring 4560a and first lower indicator ring 4560b can define an annular upper indicator ring surface 4662 and an annular lower indicator ring surface 4668 opposite the upper indicator ring surface 4662. The upper indicator ring surface 4662 of the first upper indicator ring 4560a can be configured to engage the bolt engagement surface 4652 of the bolt head 4552, and the lower indicator ring surface 4668 of the first lower indicator ring 4560b can be configured to engage the nut engagement surface 4658 of the threaded nut 4558 when the first indicator assembly 35 is assembled with and tightened on the coupling assembly 4500.

Figure 3:
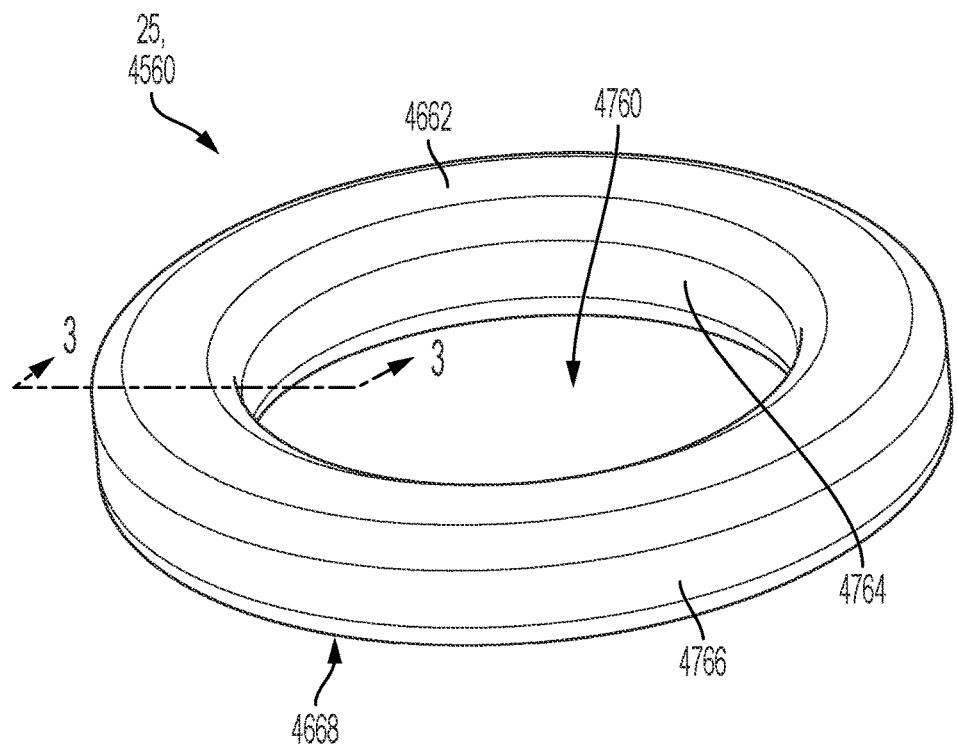
FIG. 3 is a perspective view of one of the positive installation indicators of FIG. 2.

FIG. 3 illustrates one of the indicator rings 4560, according an example aspect of the present disclosure. Example aspects of the indicator ring 4560 can define an annular inner ring surface 4764 and an annular outer ring surface 4766 opposite the inner ring surface 4764. The indicator ring 4560 can further define the annular upper indicator ring surface 4662 and the annular lower indicator ring surface 4668, each of which can extend between the inner ring surface 4764 and the outer ring surface 4766. In the present aspect, each of the upper indicator ring surface 4662 and lower indicator ring surface 4668 can be substantially planar; however, in other aspects, the upper and/or lower indicator ring surfaces 4662,4668 may not be planar. The inner ring surface 4764 can define the ring opening 4760, which can receive the bolt shaft 4554 of the corresponding threaded bolt 4550 (shown in FIG. 1) therethrough. The outer ring surface 4766 can define the outer diameter of the indicator ring 4560. In some aspects, the diameter of the indicator ring 4560 can be about equal to or less than the diameter of the bolt head 4552 (shown in FIG. 2). In other aspects, the diameter of the indicator ring 4560 can be greater than the diameter of the bolt head 4552. Additionally, a cross-section of the indicator ring 4560 taken along line 3-3 can be substantially rectangular, as is shown in FIG. 5. In other aspects, the cross-section of the indicator ring 4560 can define any other suitable shape, including but not limited to, circular or oval. As described above, the indicator ring 4560 can comprise a resilient and elastic material, such as, for example, rubber.

Figure 4:
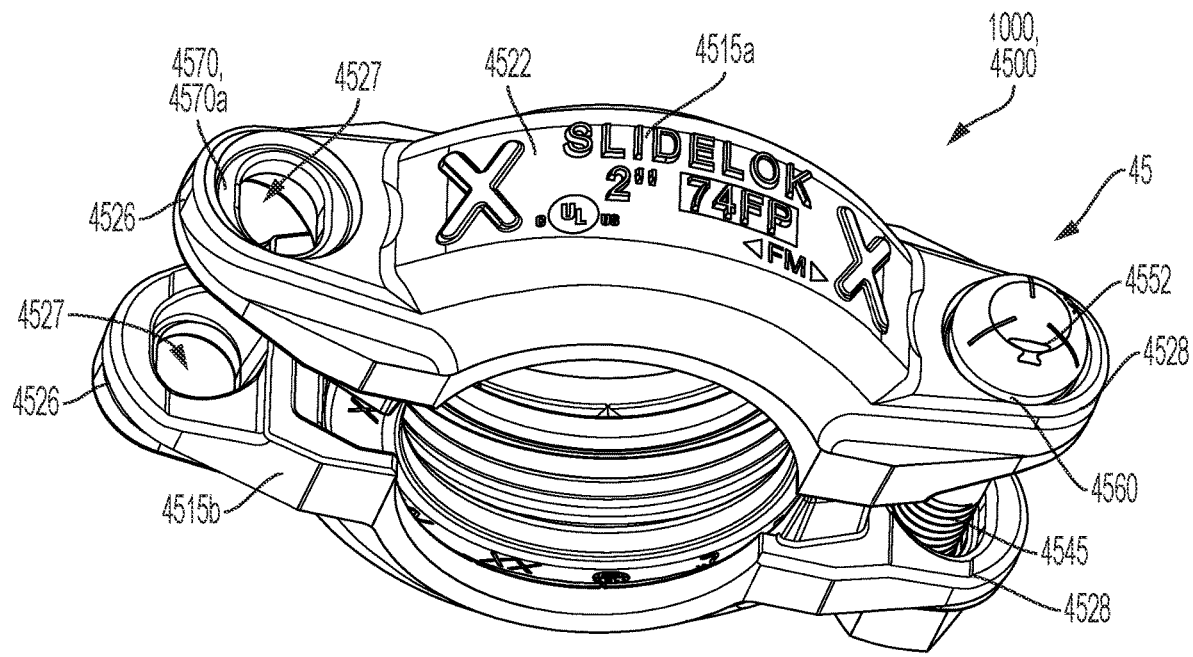
FIG. 4 is a top perspective of the coupling assembly of FIG. 1 with one of the indicator assemblies removed.

FIG. 4 illustrates the coupling assembly 4500 with the first indicator assembly 35 (shown in FIG. 1) removed for visibility of one of the retaining grooves 4570—specifically, the first upper retaining groove 4570a of the upper coupling segment 4515a. As shown, in the present aspect, each of the retaining grooves 4570 can be formed as a countersink. The first upper retaining groove 4570a can be illustrative of all of the retaining grooves 4570. As shown, the upper coupling segment 4515a can define the first fastener lug 4526 at the first end 4516 thereof. The corresponding first fastener opening 4527 can be formed through the first fastener lug 4526. Furthermore, as shown, the outer surface 4522 of the upper coupling segment 4515a can define the first upper retaining groove 4570a generally surrounding the first fastener opening 4527. According to example aspects, a diameter of the first upper retaining groove 4570a and the outer diameter of the corresponding indicator ring 4560 received therein (i.e., the first upper indicator ring 4560a, shown in FIG. 1) can be greater than a width or diameter of the first fastener opening 4527, such that the first upper indicator ring 4560a can be prohibited from passing through the first fastener opening 4527. Additionally, the diameter of the first upper retaining groove 4570a can be greater than the diameter of the bolt head 4552 of the corresponding first fastener 4540 (shown in FIG. 1) to allow the first upper indicator ring 4560a to extrude around the bolt head 4552.

FIG. 5 illustrates a cross-sectional of the coupling assembly 4500 taken along line 5-5 of FIG. 1, wherein the indicator assemblies 30 are in the loosened configuration, prior to tightening of the coupling assembly 4500. As shown, the coupling assembly 4500 can comprise the upper and lower coupling segments 4515a,4515b. Each of the upper and lower coupling segments 4515a,4515b can define the corresponding first and second fastener lugs 4526,4528. The first fastener opening 4527 can be formed through each of the first fastener lugs 4526, and the second fastener opening 4529 can be formed through each of the second fastener lugs 4528. The first fastener 4540 can extend through each of the first fastener openings 4527 to couple the upper coupling segment 4515a to the lower coupling segment 4515b at the first ends 4516 thereof, and the second fastener 4545 can extend through each of the second fastener openings 4529 to couple the upper coupling segment 4515a to the lower coupling segment 4515b at the second ends 4518 thereof. The first upper indicator ring 4560a and the first lower indicator ring 4560b can be oriented within the first upper retaining groove 4570a and the first lower retaining groove 4570b, respectively. The second upper indicator ring 4560c and the second lower indicator ring 4560d can be oriented within the second upper retaining groove 4570c and the second lower retaining groove 4570d, respectively. As shown, the first fastener 4540 can define a fastener axis 4505 extending centrally therethrough, and each of the corresponding first upper and lower indicator rings 4560a,b can concentric to the fastener axis 4505. Similarly, the second upper and lower indicator rings 4560c,d can be concentric to the fastener axis 4505 of the second fastener 4545.

FIG. 6 illustrates a cross-sectional view of the coupling assembly 4500 taken along line 5-5 of FIG. 1, wherein each of the indicator assemblies 30 are in the tightened configuration with the fasteners 40 tightened. To tighten the fasteners 40, the threaded nuts 4558 can be rotated on the corresponding threaded bolts 4550 to bias the upper and lower coupling segments 4515*a,b* towards one another. Referring to the first indicator assembly 35, the first upper and lower indicator rings 4560*a,b* can be compressed as the first fastener 4540 is tightened and can extrude out of the corresponding first upper and lower retaining grooves 4570*a,b* to visually indicate when the first fastener 4540 has been suitably tightened. In the same way, the second upper and lower indicator rings 4560*c,d* can be compressed as the second fastener 4545 is tightened, and can extrude out of the corresponding second upper and lower retaining grooves 4570*c,d* to visually indicate when the second fastener 4545 is suitably tightened. In other aspects, the indicator assemblies 30 can be used on any other suitable type of pipe fitting 10 where it is desired to visually indicate that fasteners 40 have been suitably tightened and that the pipe fitting 10 has been properly secured to the corresponding pipe section(s) 700 (shown in FIG. 7) or other pipe fitting.

Figure 7:
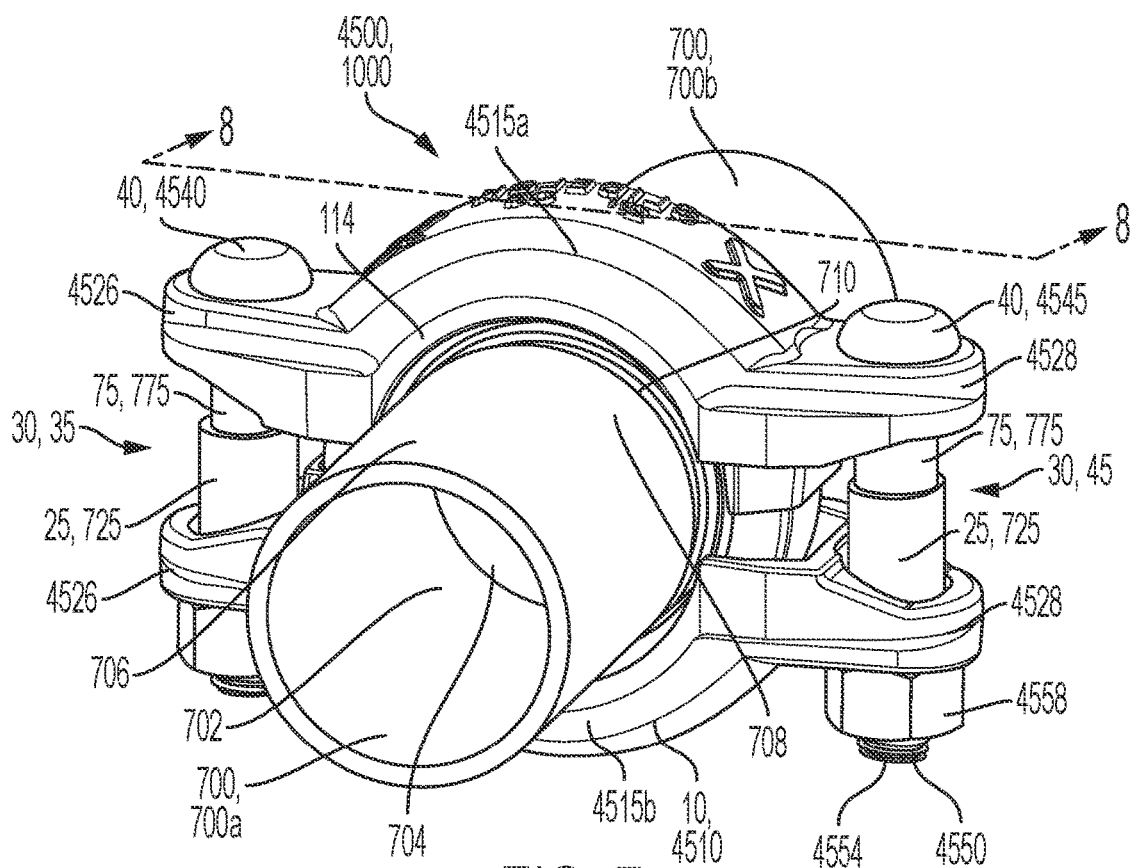
FIG. 7 is a perspective view of the coupling assembly comprising a pair of the indicator assemblies, in accordance with another example aspect of the present disclosure, wherein the coupling assembly is assembled with a pair of pipe sections.

FIG. 7 illustrates a perspective view of the fitting assembly 1000 according to another example aspect of the present disclosure. The fitting assembly 1000 can comprise the pipe fitting 10 and at least one of the indicator assemblies 30. The fitting assembly 1000 can be the coupling assembly 4500, and the pipe fitting 10 can be the pipe coupling 4510, as shown. In other aspects, the pipe fitting 10 can be any other suitable type of fitting. In the present view, the pipe fitting 10 can be coupled to each of the first and second pipe sections 700*a,b* to secure the first and second pipe sections 700*a,b* together. The pipe fitting 10 can comprise the upper and lower coupling segments 4515*a*, 4515*b*, which can be secured together around the opposing ends 702,704 of the first and second pipe sections 700*a,b* by engaging the first and second arcuate keys 114,116 (second arcuate key 116 shown in FIG. 1) with the outer surface 706 of the first and second pipe sections 700*a,b*.

The fitting assembly 1000 can comprise both of the first and second indicator assemblies 35,45. Each of the indicator assemblies 30 can comprise can comprise one of the fasteners 40 and one or more of the positive installation indicators 25. The first indicator assembly 35 can comprise the first fastener 4540 and the second indicator assembly 45 can comprise the second fastener 4545. Each of the first and second fasteners 4540,4545 can comprise the threaded bolt 4550 and the threaded nut 4558. Furthermore, in the present aspect, each of the indicator assemblies 30 can comprise one of the positive installation indicator 25, as well as a negative installation indicator 75. As shown, the positive installation indicator 25 can be an outer indicator 725 and the negative installation indicator 75 can be an inner indicator 775 in the present aspect. Referring to the first indicator assembly 35, which can be substantially identical to the second indicator assembly 45, the corresponding outer and inner indicators 725,775 can mounted on the bolt shaft 4554 of the threaded bolt 4550 and can be positioned between the first fastener lugs 4526 of the upper and lower coupling segments 4515*a*, 4515*b*. According to example aspects, the inner indicator 775 can slidably engage the outer indicator 725, as described in further detail below. In the present aspect, the inner indicator 775 can be oriented proximate to the upper coupling segment 4515*a*, and the outer indicator 725 can be oriented proximate to the lower coupling segment 4515*b*. In other aspects, the orientation of the outer and inner indicators 725,775 can be reversed. Each of the outer and inner indicators 725,775 can be formed as a substantially tubular sleeve in the present aspect. However, other aspects of the positive and negative installation indicators 25,75 can define any suitable shape. Furthermore, each of the inner indicator 775 and outer indicator 725 can be sized to prohibit the outer and inner indicators 725,775 from passing through the first and second fastener openings 4527,4529 (shown in FIG. 8) of the coupling segments 4515*a*,4515*b*. The outer and inner indicators 725,775 of the second indicator assembly 45 can be mounted on the corresponding threaded bolt 4550 between the second fastener lugs 4528 in the same way.

Figure 8:
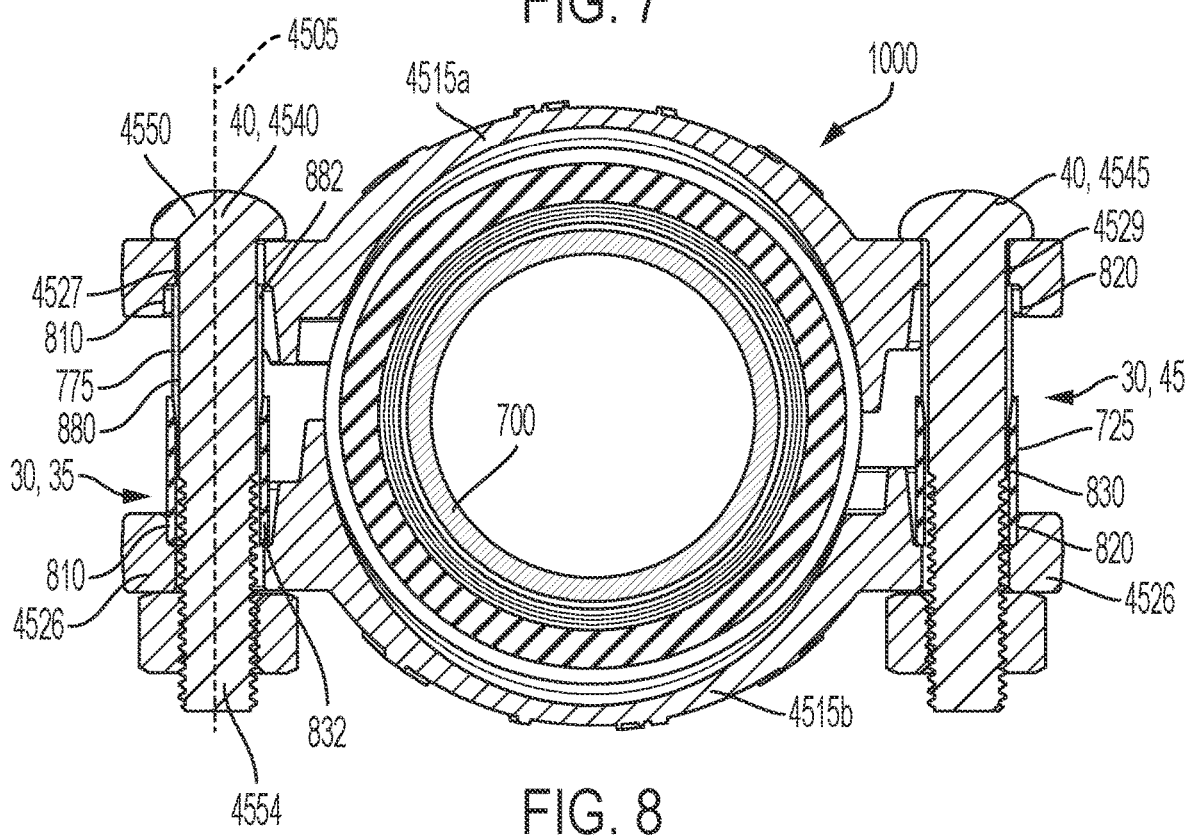
FIG. 8 is a cross-sectional view of the coupling assembly of FIG. 7 taken along line 8-8 in FIG. 7, wherein each of the indicator assemblies are in the loosened configuration.

FIG. 8 illustrates a cross-sectional view of the fitting assembly 1000 taken along line 8-8 in FIG. 7, wherein the fasteners 40 are loosened and the indicator assemblies 30 are in the loosened configuration. In some aspects, each of the first fastener lugs 4526 of the upper and lower coupling segments 4515*a,b* can define a first indicator recess 810, and each of the second fastener lugs 4528 of the of the upper and lower coupling segments 4515*a,b* can define a second indicator recess 820. The first indicator recesses 810 of the upper and lower coupling segments 4515*a,b* can be configured to receive first ends 832,882 of the corresponding outer and inner indicators 725,775, respectively, of the first indicator assembly 35. Similarly, the second indicator recesses 820 of the upper and lower coupling segments 4515*a,b* can be configured to receive the first ends 832,882 of the corresponding outer and inner indicators 725,775, respectively, of the second indicator assembly 45. Thus, the first ends 882 of the inner indicators 775 can be concealed within the corresponding first and second indicator recesses 810,820 of the upper coupling segment 4515*a*, and the first ends 832 of the outer indicators 725 can be concealed within the corresponding first and second indicator recesses 810,820 of the lower coupling segment 4515*b*. As shown, each of the inner indicators 775 can define an inner channel 880, and each of the outer indicators 725 can define an outer channel 830. The bolt shaft 4554 of the corresponding threaded bolt 4550 can extend through the inner channel 880 and the outer channel 830 to mount the outer and inner indicators 725,775 thereon. Furthermore, the inner indicator 775 can telescopingly engage the outer channel 830 of the outer indicator 725.

In some aspects, an outer diameter $D_1$ (shown in FIG. 9A) of the inner indicator 775 can be less than a diameter $D_2$ (shown in FIG. 9B) of the outer channel 830 to facilitate sliding the inner indicator 775 within the outer channel 830. In other aspects, the outer diameter $D_1$ of the inner indicator 775 can be about equal to or greater than the diameter $D_2$ of the outer channel 830, and the outer indicator 725 can be configured to flex or stretch to accommodate telescoping the inner indicator 775 within the outer channel 830, which can slide the outer indicator 725 over the inner indicator 775. In some aspects, the inner indicator 775 can define a hardness that can be different from a harness of the outer indicator 725. Furthermore, in some aspects, the inner indicator 775 can define an elasticity than can be different from an elasticity of the outer indicator 725. For example, in some aspects, the outer indicator 725 can comprise and elastic, resilient material, such as, such as rubber, and the inner indicator 775 can comprise a harder or less elastic material, such as plastic. In aspects wherein the inner indicator 775 is formed of a material that is harder or less elastic than the material forming the outer indicator 725, the outer indicator 725 can expand radially outwardly to accommodate the inner indicator 775 being further inserted into the outer channel 830, as described in further detail below. In other aspects, the inner indicator 775 and/or outer indicator 725 can comprise any other suitable material, including but not limited to, foam, plastic, composites, metal, and the like. In some aspects, the outer and inner indicators 725,775 can comprise the same material. Furthermore, in some aspects, the portions of the inner indicators 775 received in the corresponding outer channels 830 can be compressed between the corresponding outer indicator 725 and the corresponding bolt shaft 4554. In other aspects, the inner indicators 775 may not be compressible.

According to example aspects, the negative installation indicator 75 (i.e., the inner indicator 775) can be of a color that is different than a color of the positive installation indicator 25 (i.e., the outer indicator 725). For example, in a particular aspect, the negative installation indicator 75 can be red while the positive installation indicator 25 can be green. In other aspects, the negative installation indicator 75 and positive installation indicator 25 can be any suitable color. When the fasteners 40 are loosened and the indicator assemblies 35,45 are in the loosened configuration, as shown, the negative installation indicator 75 can be positioned substantially outside of the outer channel 830, such that the negative installation indicator 75 can be visible to a viewer, such as an installer installing the fitting assembly 1000 with the pipe sections 700. Visibility of the negative installation indicator 75 can indicate to the viewer that the indicator assemblies 30 are in the loosened configuration and are not suitably tightened. Thus, visibility of negative installation indicator 75 can warn of improper or loose installation. The color difference between the negative installation indicators 75 and positive installation indicators 25 can aid in the visibility of the negative installation indicators 75, and in some aspects, the color of the negative installation indicator 75 itself can be a warning color, such as red, which is universally associated with caution and hazard. Similarly, the color of the positive installation indicator 25 itself can be an affirming color, such as green, which is universally associated with correctness. In other aspects, the positive installation indicator 25 and/or negative installation indicator 75 can define any other color. Other aspects of the negative installation indicators 75 and/or positive installation indicators 25 can have any other suitable distinguishing marks or indicia to visually indicate when the fasteners 40 are properly or improperly tightened.

Figure 9A:
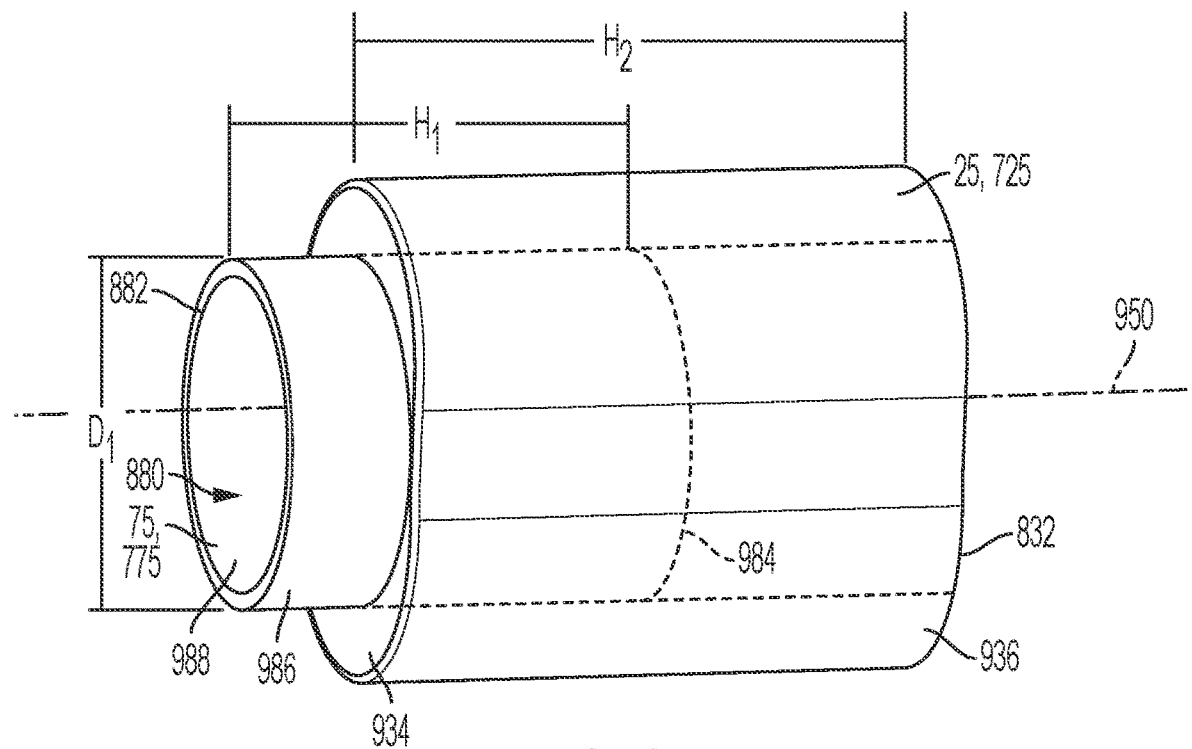
FIG. 9A is left perspective view of an inner indicator assembled with an outer indicator.
Figure 9B:
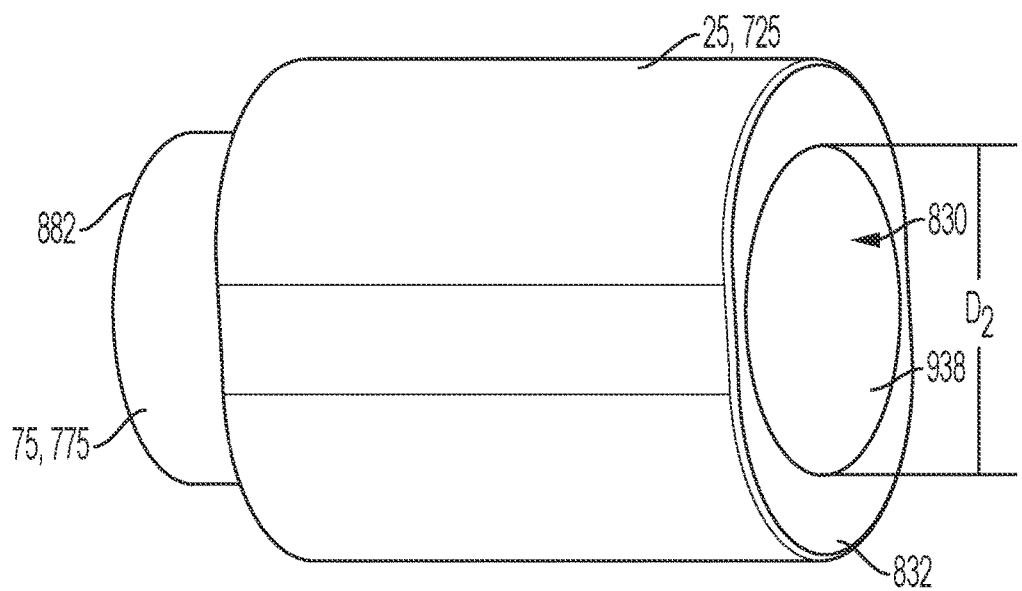
FIG. 9B is a right perspective view thereof.

FIGS. 9A and 9B illustrates perspective views of the inner indicator 775 assembled with the outer indicator 725. The outer indicator 725 is illustrated as transparent in FIG. 9A for full visibility of the inner indicator 775. As shown, inner indicator 775 can define the first end 882, a second end 984 opposite the first end 882, an outer surface 986, and an inner surface 988. The inner surface 988 of the inner indicator 775 can define the inner channel 880 extending from the first end 882 to the second end 984. In the present aspect, the outer surface 986 of the inner indicator 775 can define a substantially circular cross-section and can define the outer diameter $D_1$. Example aspects of the outer indicator 725 can also define can define the first end 832, a second end 934 opposite the first end 832, an outer surface 936, and an inner surface 938 (shown in FIG. 9B). The outer surface 936 of the outer indicator 725 can define a substantially capsule-shaped cross-section. In other aspects, the outer surface 936 can define any other suitable cross-sectional shape. The inner surface 938 of the outer indicator 725 can define the outer channel 830 (shown in FIG. 9B) extending from the first end 832 to the second end 934. The outer channel 830 can define the diameter $D_2$ (shown in FIG. 9B) and can further define an indicator axis 950 extending centrally therethrough. The inner indicator 775 can be coaxial with the outer indicator 725.

Figure 10:
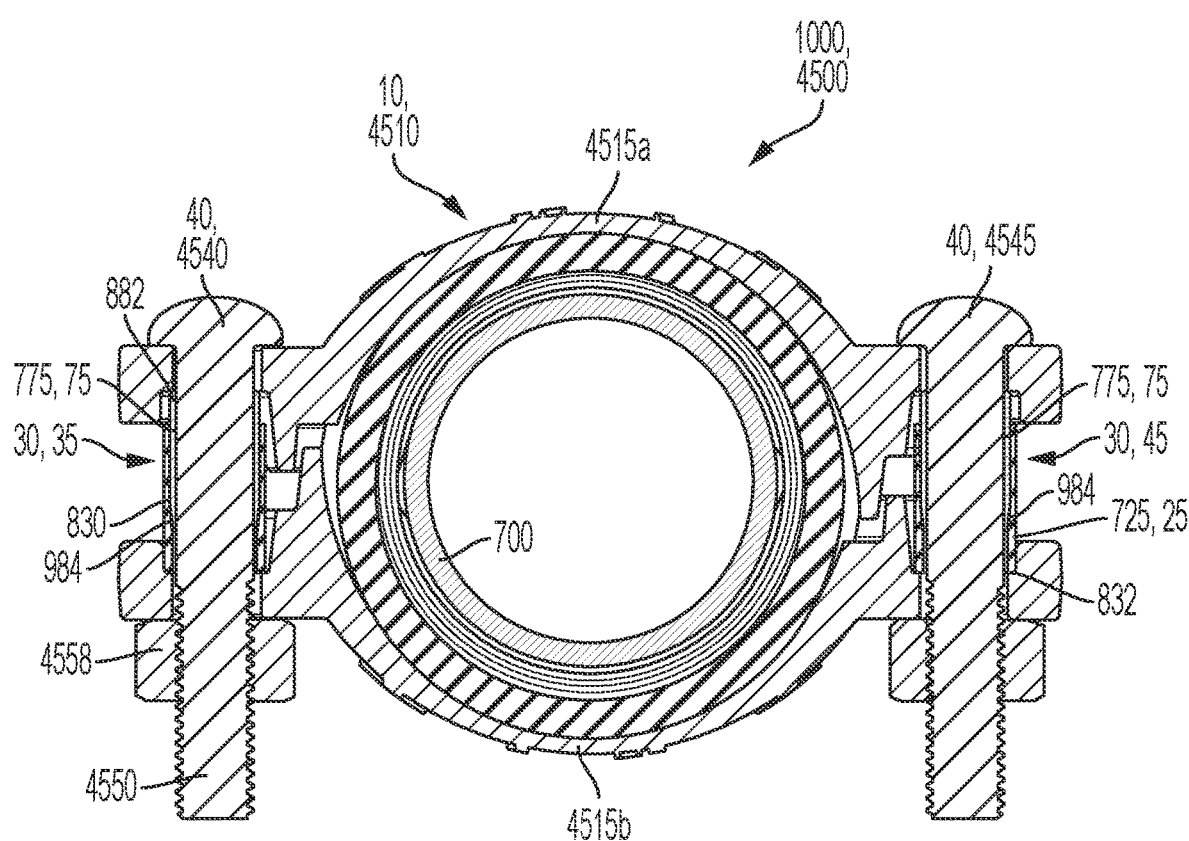
FIG. 10 is a cross-sectional view of the coupling assembly of FIG. 7 taken along line 8-8 in FIG. 7, wherein each of the indicator assemblies is in a tightened configuration.

Furthermore, the inner indicator 775 can slidably engage the outer channel 830, as shown, such that the outer indicator 725 can be slid over the inner indicator 775. In the present aspect, the second end 984 of the inner indicator 775 can be slidably inserted into the outer channel 830 at the second end 934 of the outer indicator 725. In some aspects, the second end 984 of the inner indicator 775 can be tapered to facilitate sliding the inner indicator 775 further through the outer channel 830. (The taper of the second ends 984 is best seen in FIG. 10.) Additionally, in the present aspect, the outer diameter $D_1$ of the inner indicator 775 can be about equal to or slightly larger than the diameter $D_2$ of the outer channel 830, and the outer indicator 725 can be configured to stretch radially outward, relative to the indicator axis 950, to allow the inner indicator 775 to telescope within the outer channel 830. Additionally, in some aspects, a height $H_1$ of the inner indicator 775 can be about equal to or less than a height $H_2$ of the outer indicator 725, such that the outer indicator 725 can substantially cover the inner indicator 775 when the inner indicator 775 is substantially telescoped into the outer channel 830 in the tightened configuration. In some aspects, the first ends 882 of the inner indicators 775 can be received within the corresponding first and second indicator recesses 810,820 (shown in FIG. 8) of the upper coupling segment 4515a (shown in FIG. 8), and thus the first ends 882 can be external to the outer channel 830 in the tightened configuration.

FIG. 10 illustrates cross-sectional view of the fitting assembly 1000 taken along line 8-8 in FIG. 7, wherein the fasteners 40 are tightened and the indicator assemblies 30 are in the tightened configuration. As the fasteners 40 are tightened by rotating the threaded nuts 4558 on the corresponding threaded bolts 4550, the upper and lower coupling segments 4515a,b can be biased towards one another. The outer and inner indicators 725,775 can be mounted on the corresponding threaded bolts 4550 between the upper and lower coupling segments 4515a,b, as described above. Thus, as the upper and lower coupling segments 4515a,b move towards one another, the upper coupling segment 4515a can engage the first ends 882 of the inner indicators 775 to bias the inner indicators 775 towards the outer indicators 725, and the lower coupling segment 4515b can engage the first ends 832 of the outer indicators 725 to bias the outer indicators 725 towards the inner indicators 775. Each of the inner indicators 775 can telescope into the outer channel 830 of the corresponding outer indicators 725, and the outer indicators 725 can expand radially outward to accommodate the inner indicators 775 therein.

When the fasteners 40 have been suitably tightened, the inner indicators 775 can be substantially received in the corresponding outer channels 830 of the outer indicators 725, such that the outer indicators 725 can substantially cover the inner indicators 775. In the present aspect, the first ends 882 of the inner indicators 775 can be external to the corresponding outer channels 830; however, the first ends 882 of the inner indicators 775 can be concealed by the upper coupling segment 4515a, as described above, and the outer indicators 725 can abut the upper coupling segment 4515a. Thus, the inner indicators 775 can be no longer visible to the installer in the tightened configuration of the indicator assemblies 30. Visibility of only the outer indicators 725 can indicate that the fasteners 40 are suitably tightened and that the pipe coupling 4510 is properly secured to the pipe sections 700. In other aspects, the indicator assemblies 30 can be used on any other suitable type of pipe fitting 10 where it is desired to visually indicate that fasteners 40 have been suitably tightened and that the pipe fitting 10 has been properly secured to the corresponding pipe section(s) 700 or other pipe fitting.

One should note that the different aspects disclosed herein can be combined such that the indicator assemblies can include the features of more than one aspect. One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fitting assembly comprising:
a pipe fitting defining a fastener opening and a retaining groove; and
an indicator assembly configurable in a loosened configuration and a tightened configuration, the indicator assembly comprising:
a fastener defining a first fastener portion and a second fastener portion, the second fastener portion extending through the fastener opening; and
a positive installation indicator oriented within the retaining groove between the fastener opening and the first fastener portion;
wherein, in the tightened configuration, the positive installation indicator is compressed between the pipe fitting and the first fastener portion and extrudes at least partially out of the retaining groove, and in the loosened configuration, the positive installation indicator is substantially hidden within the retaining groove by the first fastener portion.

2. The fitting assembly of claim 1, wherein the pipe fitting defines an outer surface and an inner surface, the inner surface at least partially defining a channel configured to receive a pipe section, the retaining groove defined in the outer surface.

3. The fitting assembly of claim 1, wherein the positive installation indicator is an indicator ring defining a ring opening, the second fastener portion extending through the ring opening.

4. The fitting assembly of claim 3, wherein the fastener defines a fastener axis, and wherein the indicator ring is concentric to the fastener axis.

5. The fitting assembly of claim 1, wherein the positive installation indicator comprises a resilient and elastic material.

6. The fitting assembly of claim 1, wherein:
the fastener comprises a bolt defining a bolt head and a threaded bolt tail;
the bolt head is the first fastener portion, the bolt head defining a bolt engagement surface abutting the positive installation indicator;
the threaded bolt tail is the second fastener portion and extends from the bolt engagement surface; and
the fastener further comprises a threaded nut rotatably mounted on the threaded bolt tail.

7. The fitting assembly of claim 6, wherein a diameter of the bolt head is less than a diameter of the retaining ring.

8. The fitting assembly of claim 1, wherein:
the pipe fitting is a pipe coupling comprising an upper coupling segment and a lower coupling segment;
the upper coupling segment defines the fastener opening and the retaining groove, and the positive installation indicator is compressed between the upper coupling segment and the first fastener portion; and
the fastener couples the upper coupling segment to the lower coupling segment.

9. The fitting assembly of claim 8, wherein:
the lower coupling segment defines a second fastener opening and a second retaining groove;
a second positive installation indicator is oriented within the second retaining groove between the second fastener opening and a nut of the fastener; and
the second positive installation indicator is compressed between the lower coupling segment and the nut and extrudes at least partially out of the second retaining groove in the tightened configuration.

10. The fitting assembly of claim 9, wherein each of the upper and lower coupling segments defines an inner surface and an outer surface, the inner surfaces together defining a channel configured to receive a pipe section, the first retaining groove formed in the outer surface of the upper coupling segment, and the second retaining groove formed in the inner surface of the lower coupling segment.

* * * * *